Dec. 25, 1923.
1,478,587
C. E. STONER
LATERAL DIRIGIBLE LIGHT FOR VEHICLES
Filed May 10, 1921
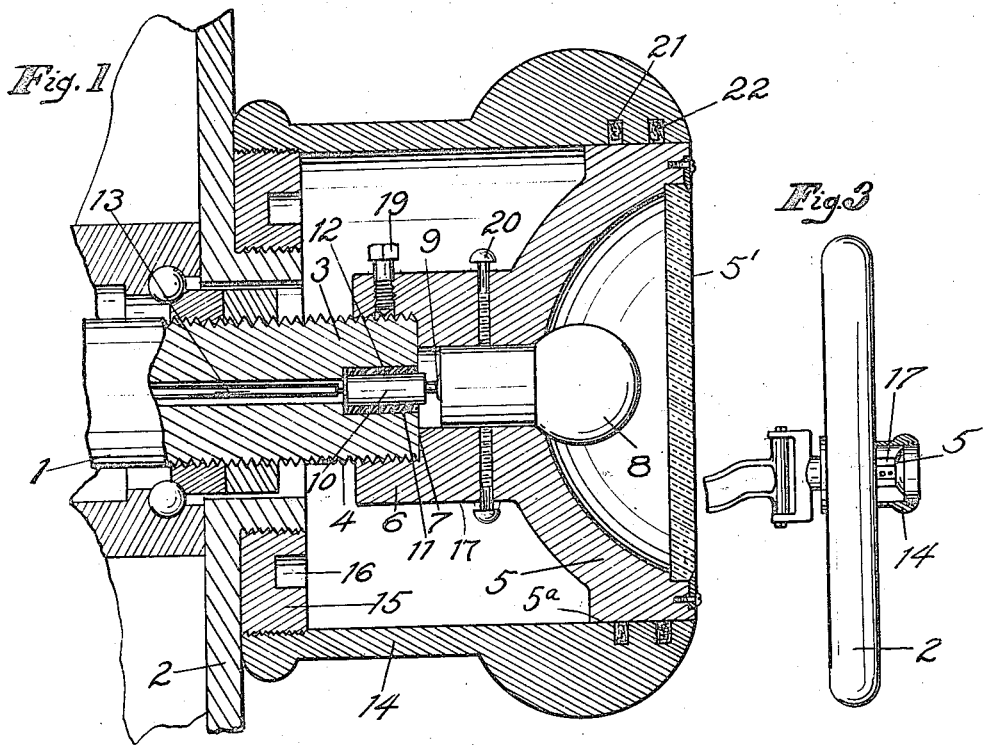
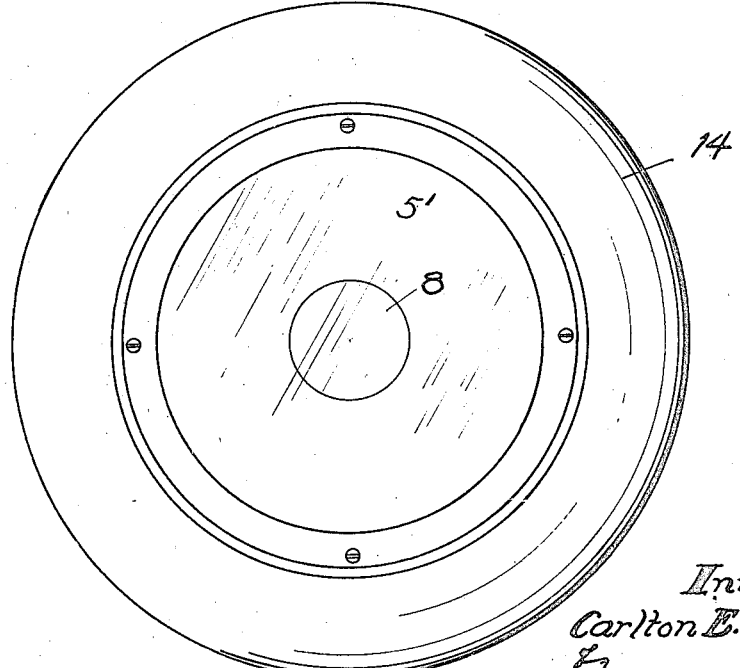
Witness:
L. Whipple
Inventor:
Carlton E. Stoner.
by James R. Townsend
his atty.

Patented Dec. 25, 1923.

1,478,587

UNITED STATES PATENT OFFICE.

CARLTON E. STONER, OF LONG BEACH, CALIFORNIA.

LATERAL DIRIGIBLE LIGHT FOR VEHICLES.

Application filed May 10, 1921. Serial No. 468,389.

*To all whom it may concern:*

Be it known that I, CARLTON E. STONER, a citizen of the United States, residing at Long Beach, in the county of Los Angeles and State of California, have invented a new and useful Improvement in Lateral Dirigible Lights for Vehicles, of which the following is a specification.

The present invention is an improvement of the device set forth in my application for Letters Patent Serial No. 462,938 filed April 20th, 1921, and some of its objects are: to simplify the construction of the device, to render it more compact and its mounting more rigid; to eliminate the necessity of intricate parts likely to get out of order or to be misplaced; and to avoid wear and friction.

Another object is to provide a construction whereby the reflector and the electric contacts will be kept free from grease and other foreign matter.

Another object is to provide a construction whereby the reflector and lens may be so mounted as to remain stationary relative to the axle with which the lamp is associated and may at the same time be protected by the hub cap revolubly mounted on the wheel.

Another object is to provide a construction whereby the light may be so mounted on a vehicle axle that it will not be liable to be jarred loose by vibration, and may at the same time be practically hidden from view so that the vehicle wheel to which it is attached will have the appearance of a standard wheel devoid of other appliances.

The above objects are accomplished by mounting the lamp and reflector directly on the end of the axle, and by mounting the hub cap on the wheel coaxially with the reflector, and rotatably in contact therewith.

Another object is to provide a device which may be attached to the hub of wheel of any make or dimensions.

Advantages of mounting the device so that the reflector and lens remain stationary and rigid relative to the axle, are, that no revolving and confusing clouds or shadows due to imperfections in the reflector or lens will be projected onto the sides of the roadway, and dimmers may be used on the lenses where desired or required by law, in a manner impossible with a revolving lens.

Other advantages are that the device is protected by the hub cap and thereby reduces breakage to a minimum, and that there are no projecting parts liable to be brushed off by contact with other articles.

Other objects, advantages and features of invention may appear from the accompanying drawing, the subjoined detail description and the appended claims.

The accompanying drawing illustrates the invention.

Figure 1 is a section of the device, showing the mounting of the lamp and reflector on the axle, and the relation of the hub cap which is mounted on the wheel, to said reflector and lamp; also the wiring and specific means of connecting the hub cap to the wheel.

Fig. 2 is a front elevation of the device showing the lens reflector and surrounding hub cap.

Fig. 3 is a view on a reduced scale showing the relation of the light to the axle and to the wheel mounted on the axle.

1 designates the axle, the same being a non-rotary member of a vehicle on which is mounted the dirigible wheel 2, the same being a rotary member of said vehicle, beyond which the threaded end 3 of the axle 1 projects a short distance. On the threaded end of the axle 1 is mounted a reflector 5, in the open front end of which there is mounted a lens 5'; said reflector having a rearwardly extending tubular sleeve 6 countersunk at 7 and provided with internal screw threads adapted to cooperate with the screw threads 4 of the axle. Mounted in the bore of the sleeve 6 is a lamp 8 preferably an incandescent bulb, one of the terminals 9 of which contacts with a contact device 10 mounted in a counterbore 11, and insulated by a sleeve 12 in said bore; a conductor 13 leads from the contact device to a suitable source of electricity not shown.

Mounted on the wheel 2 coaxially with the reflector is a tubular hub housing 14, which surrounds the reflector; has its outer end lying in the same plane as the outer end of the reflector; and is in revoluble contact therewith throughout the entire circumference of the reflector. The reflector 5 may be provided with a cylindrical portion 5ª adapted to fit snugly within the bore of the hub housing.

The hub housing may be secured to the wheel in any suitable manner and is revolvable therewith; as shown the connection is made by means of an externally and internally threaded bushing 15, various sizes of which may be provided whereby the housing may be accommodated to wheels of various sizes and makes. The bushing may be provided with recesses 16 to accommodate a wrench and the sleeve 6 may have a hexagonal outer surface 17 for the same purpose. Set screws 19 and 20 may be provided for locking the reflector on the axle and the lamp in its socket respectively, and suitable packing rings 21 may be seated in circumferential grooves 22 in the hub cap and may project from said grooves to contact with the surface of the cylindrical portion of the reflector to form a dust proof secure closure between the reflector and hub cap.

The particular organization of a non-rotary source of light adapted to project rays from the side of a rotary member that is in the direction of a produced axis of rotation of the rotary member protected from injury by a rotary hub cap and the arrangement of parts to accomplish these results as set forth above are important features of my invention.

The device as above described is fool proof against accidentally or otherwise getting grease into the electrical contact or reflector when greasing the wheel and is adapted to be secured on wheels of various sizes and makes. The device may be simply constructed; is made of few parts diminishing the likelihood of getting out of order; has no electrical brushes and eliminates friction and wear of contacting surfaces. The device in consequence of its simplicity may be made compact, need project only a minimum distance beyond the wheel rendering the likelihood of injury extremely small. The construction also adds to the rigidity of the device; can be used with dimmers and does not throw moving shadows on the roadway. The attachment of the reflector also holds the bearings and the wheel on the axle eliminating the necessity of other fastening means as a cotter pin.

I claim:

1. In combination with the axle of a vehicle, a lamp mounted on the end of said axle and a hub cap revoluble about said lamp.

2. In combination with an axle for a vehicle, a lamp non-rotatably secured to the end of the axle and a hub cap revoluble about said lamp.

3. In combination with an axle for a vehicle, a lamp non-rotatably secured to the end of the axle and a hub cap revolubly mounted about said lamp and projecting beyond said lamp.

4. In combination with the axle of a vehicle, having a wheel thereon, a lamp non-rotatably mounted on the axle and extending laterally from the wheel; and a hub cap surrounding and projecting beyond said lamp.

5. A non-rotatable axle of a vehicle, a wheel rotatably mounted thereon, a lamp and reflector non-rotatably secured to the axle, and a hub cap secured to the wheel and in rotatable contact with said reflector; said hub cap being rotatable with said wheel.

6. In combination with the dirigible wheels of a vehicle, means for projecting unobstructed rays laterally from the sides of the wheels, said means comprising lamps non-rotatably secured to the axle of the wheels; a reflector secured about the lamp; hub caps surrounding said lamps and rotatable with the wheels, said hub caps extending beyond the lamps and being in rotary contact with said reflector.

7. In combination with a non-rotary member of a vehicle and a rotatable member mounted thereon, of non-rotary means for projecting a non-rotatable light in the direction of the produced axis of rotation of said rotatable member, and means secured to said rotatable member concentric with and in rotary contact with said light projecting means for protecting said light projecting means.

8. In a device for projecting non-rotary rays of light laterally of a vehicle wheel mounted on a non-rotary axle; the organization of parts by which the source of light is mounted on the non-rotary axle comprising a hub cap open at both ends and revolvably mounted on the rotary axle concentric with and in rotatable contact circumferentially of the source of light and adapted to protect the source of light from injury; a reflector in said hub cap, and a lens mounted on the open end of the reflector.

In testimony whereof, I have hereunto set my hand at Los Angeles, California, this 23rd day of April, 1921.

CARLTON E. STONER.

Witness:
JAMES R. TOWNSEND.